Nov. 30, 1971 W. L. FOX 3,623,336
AUTOMATIC ICE MAKER SPEED SHIFTER
Filed Nov. 13, 1969 8 Sheets-Sheet 1
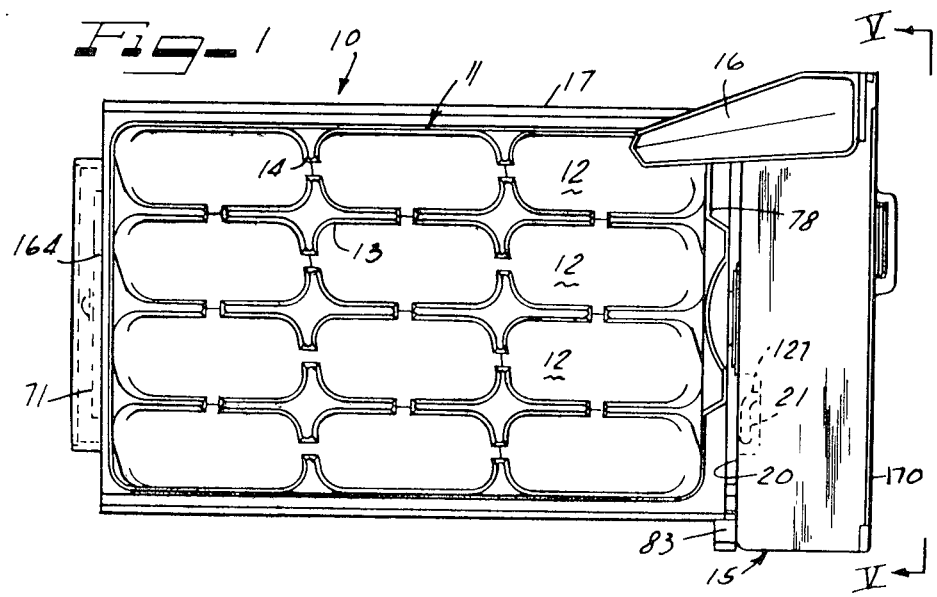
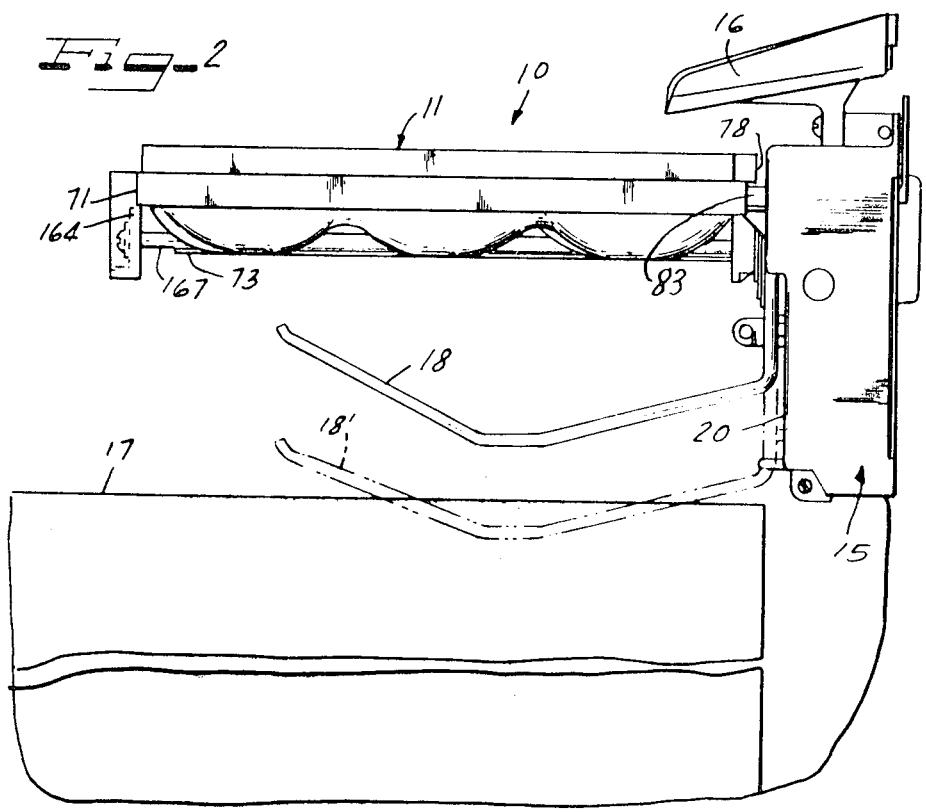
INVENTOR
William L. Fox
BY Hill, Sherman, Meroni, Gross & Simpson
ATTORNEYS Nov. 30, 1971  W. L. FOX  3,623,336
AUTOMATIC ICE MAKER SPEED SHIFTER
Filed Nov. 13, 1969  8 Sheets-Sheet 2
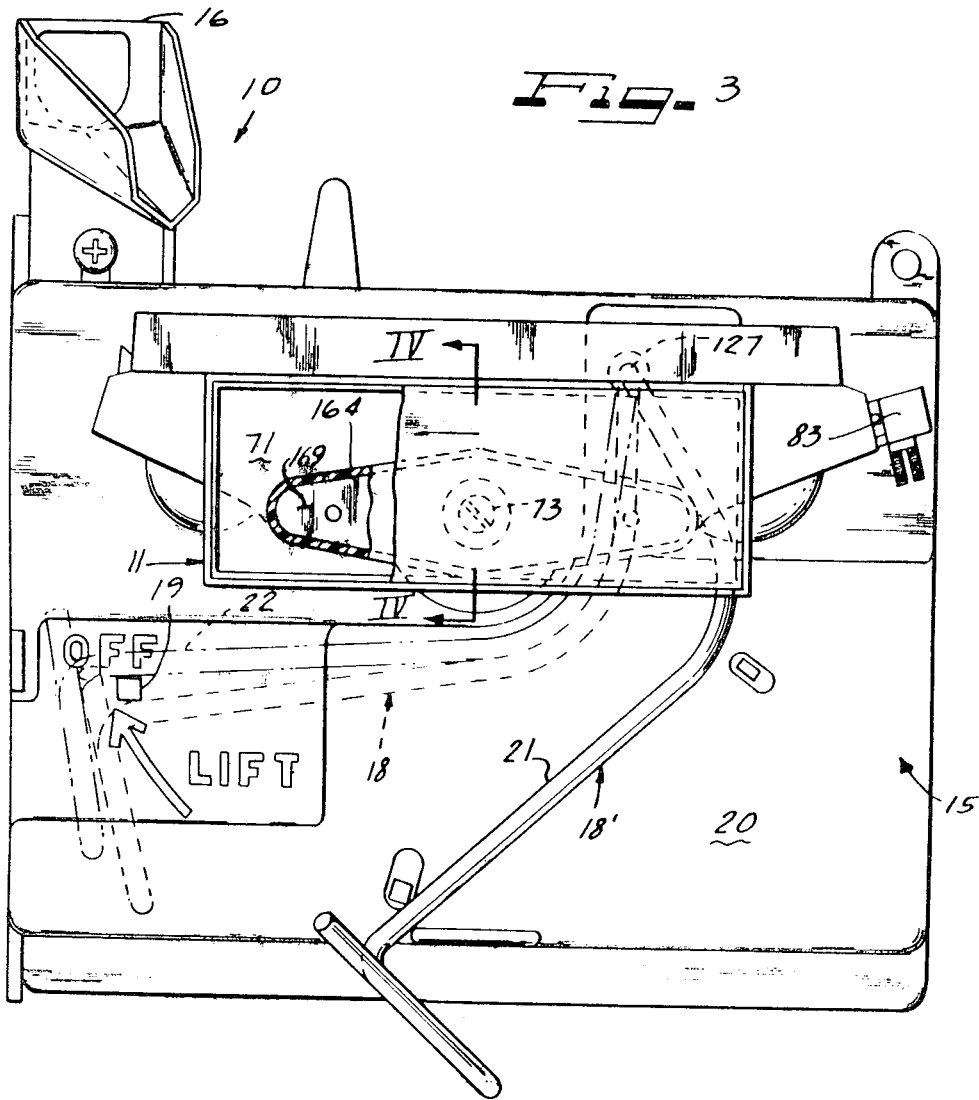
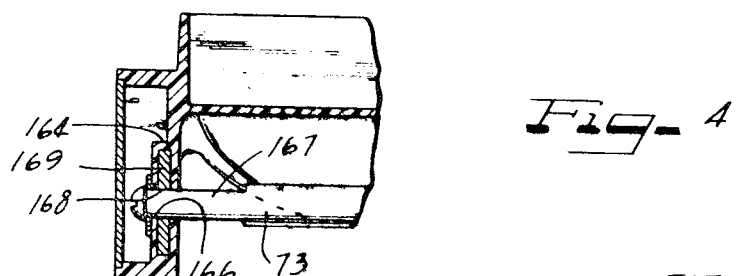
INVENTOR
William L. Fox
ATTORNEYS

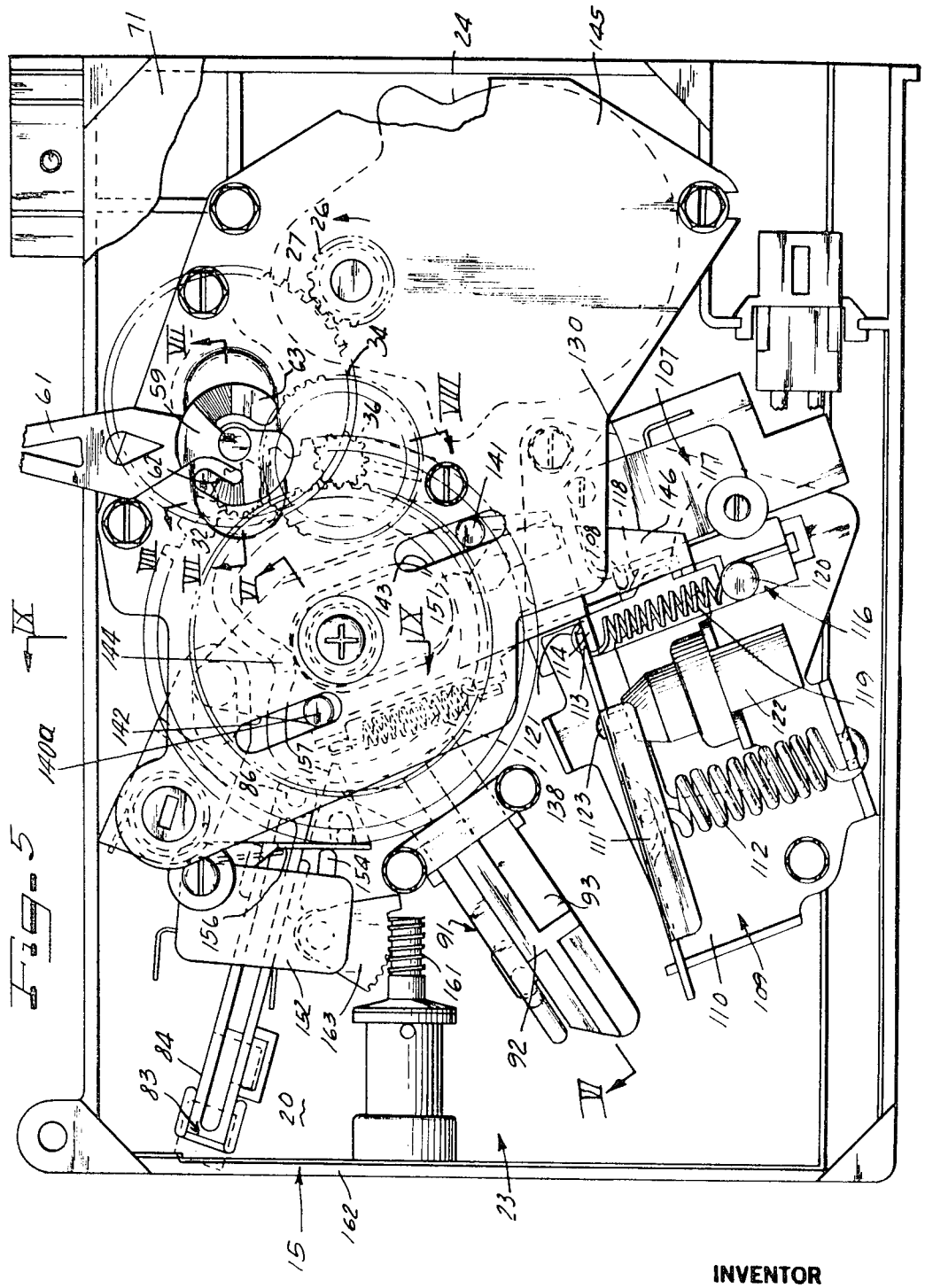

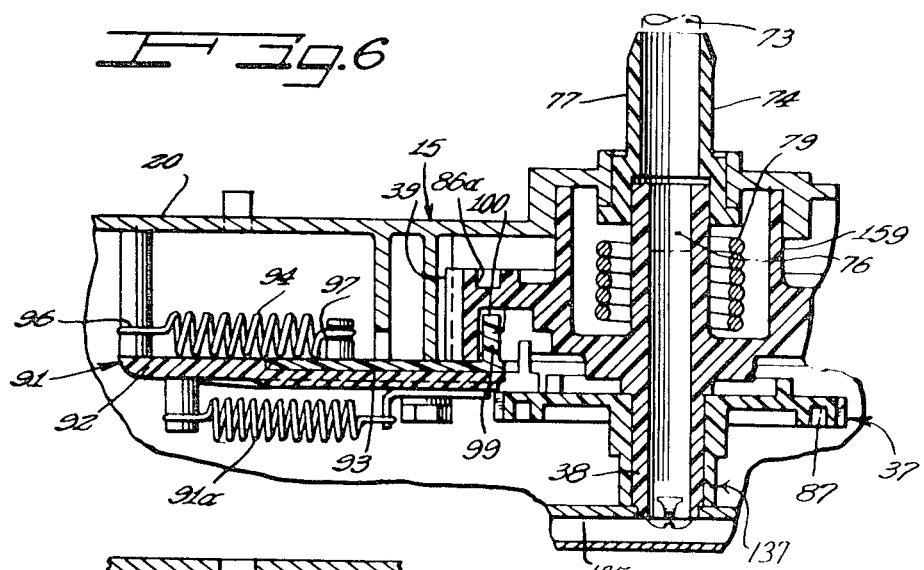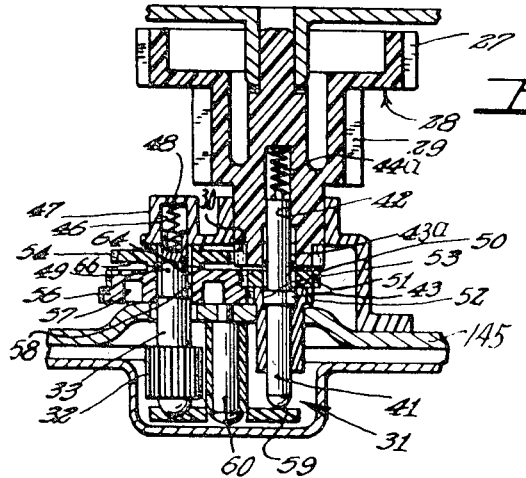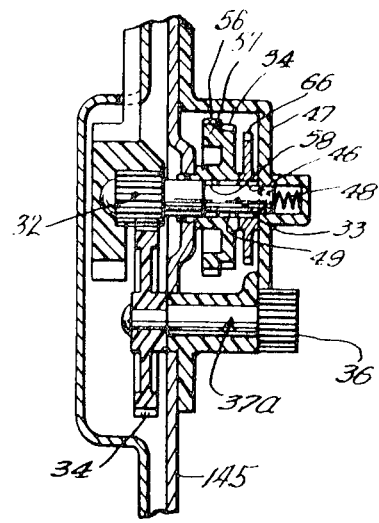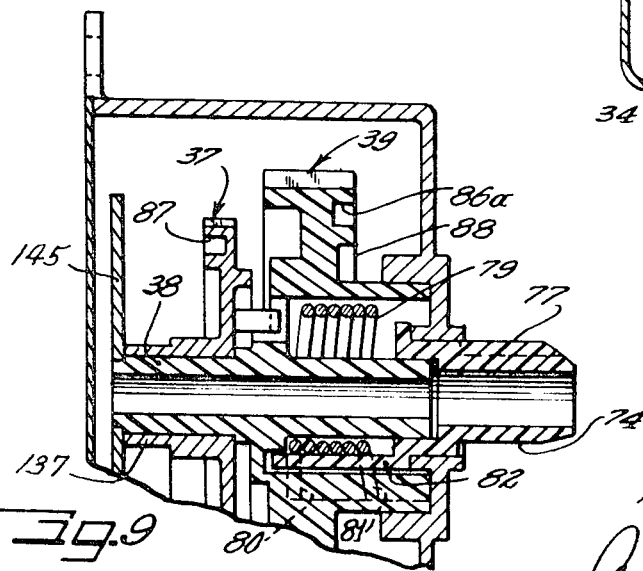

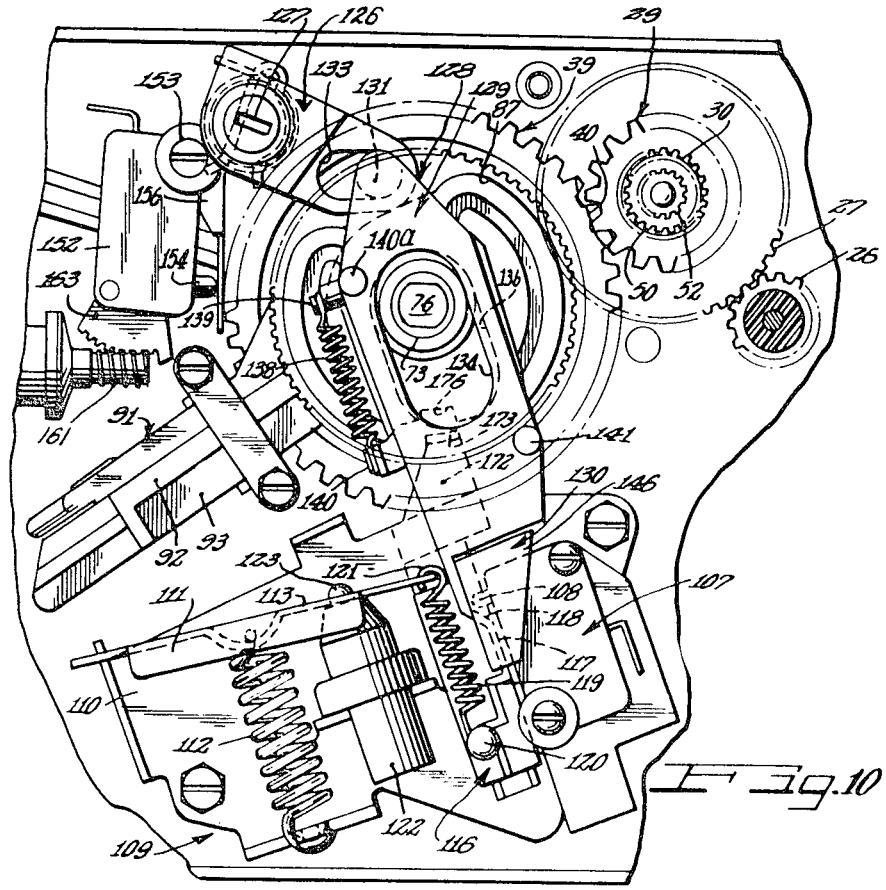
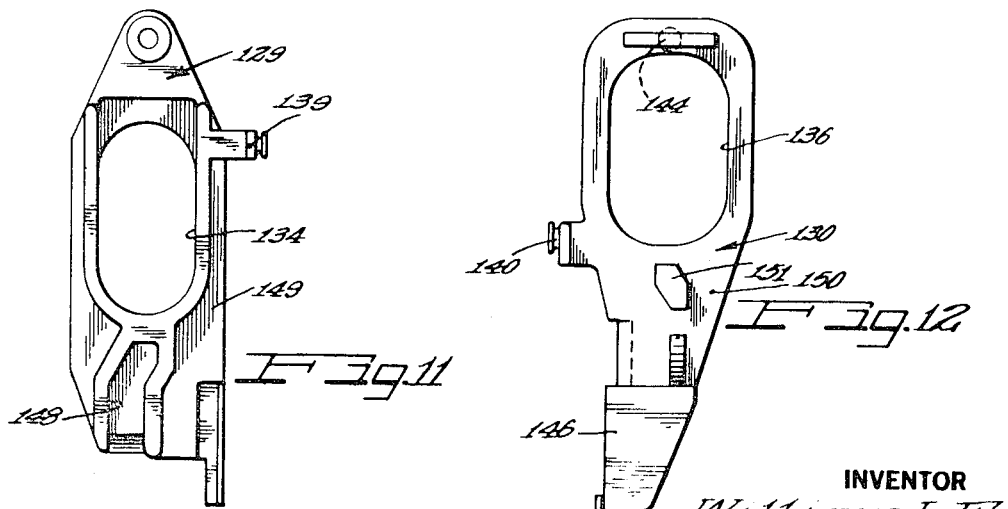

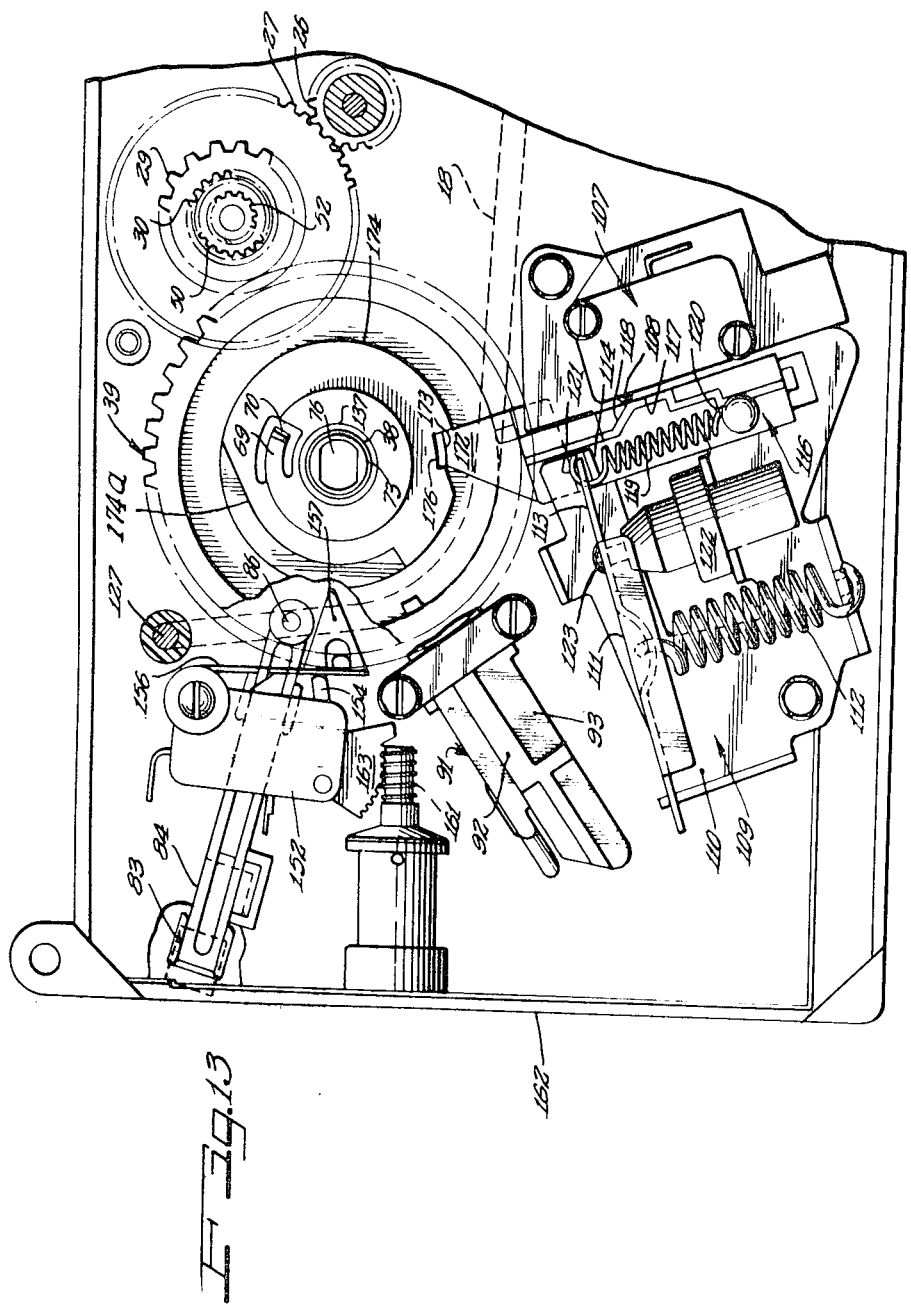

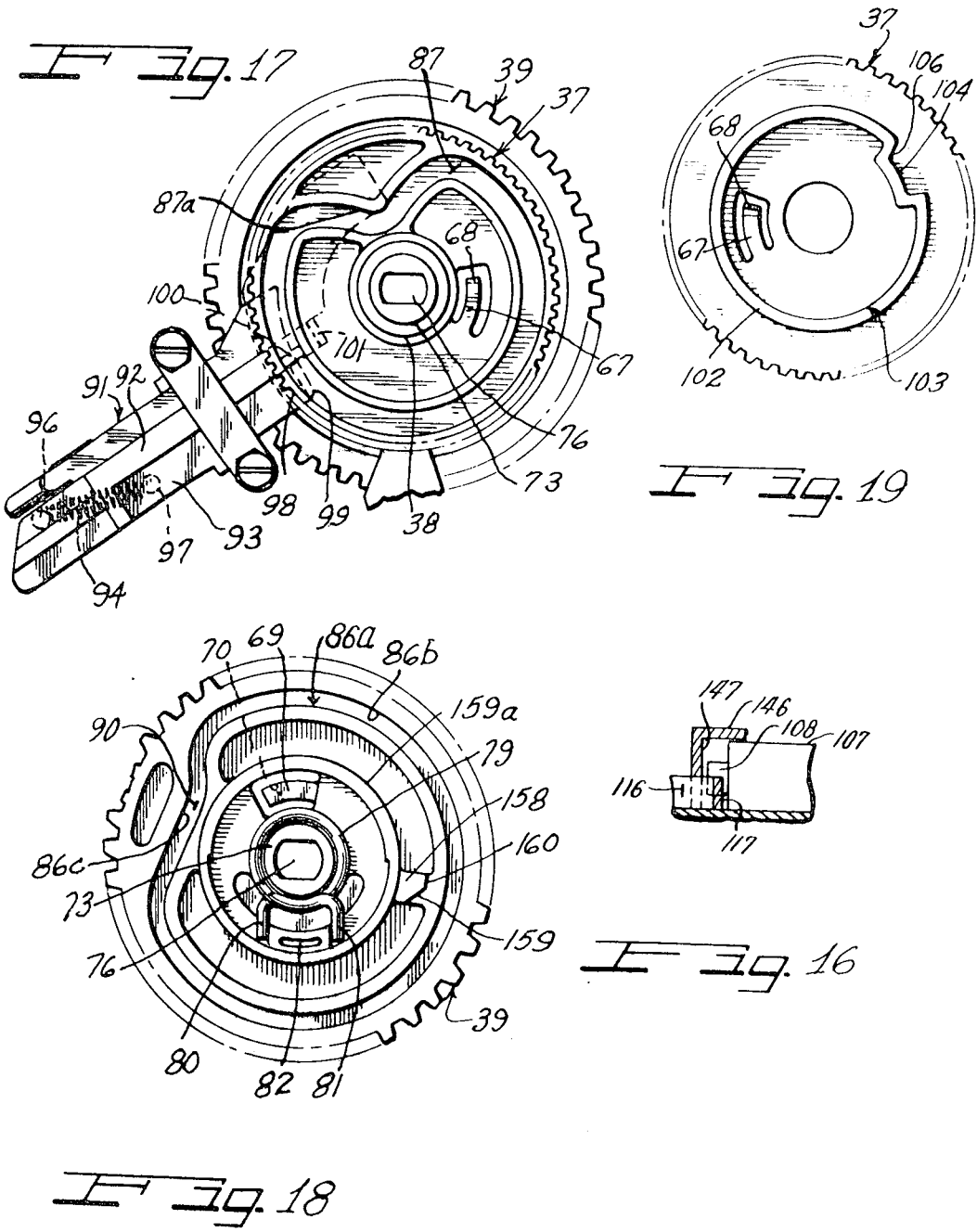

United States Patent Office 3,623,336
Patented Nov. 30, 1971

3,623,336
AUTOMATIC ICE MAKER SPEED SHIFTER
William L. Fox, Niles, Ill., assignor to Eaton Yale &
Towne Inc., Morton Grove, Ill.
Continuation-in-part of application Ser. No. 762,891,
Sept. 26, 1968. This application Nov. 13, 1969,
Ser. No. 876,402
Int. Cl. F25c 5/16
U.S. Cl. 62—233
10 Claims

ABSTRACT OF THE DISCLOSURE

A completely automatic ice cube maker which is driven through successive water fill cycles, freeze cycles and harvest cycles by a continuously operating permanent magnetic synchronous electric motor. Water is delivered to a plastic ice cube tray during the water fill cycle and the water in the tray is frozen during a freeze cycle of predetermined duration. During the harvest cycle the tray is rotated about its longitudinal axis through 360° but at approximately the mid-point of this rotation one end of the tray is arrested momentarily in its movement whereby a twisting action is applied to the tray to dislodge the cubes therefrom. The cubes drop into an ice collection basket and prior to each harvest cycle an ice level sensing mechanism operates to determine whether an excessive quantity of cubes have been collected in the basket and if so operates to deenergize the ice cube maker until the quantity of cubes in the basket has been reduced.

CROSS-REFERENCES TO RELATED APPLICATIONS

The present application is a continuation-in-part of my pending application entitled "Automatic Ice Maker," Ser. No. 762,891, filed in the United States Patent Office on Sept. 26, 1968, now Pat. No. 3,563,050.

BACKGROUND OF THE INVENTION

This invention relates generally to the field of ice makers and more particularly to automatic ice cube makers as employed, for example, in household refrigerators.

Automatic ice cube makers are, of course, known in the prior art. In some prior art devices the cubes are formed in solid molds and are ejected from the molds either forcefully by means of a fast-acting plunger or the like or are released as a result of the application of a slight amount of heat to the cubes to separate them from the surface of the molded cavities. Other known devices include plastic trays or belts in which the ice cavities are formed and the cubes are dislodged from the cavities as the cavities are inverted and a twisting action is applied thereto to distort the cavity and to separate the wall thereof from the outer surface of the cube. The present invention finds particular utility in automatic ice cube makers which employ the twist-type plastic tray in the formation and harvest of the cubes.

While many known automatic ice cube makers have enjoyed substantial commercial success a continual effort is being made to improve such devices both from the standpoint of reliability of operation as well as the standpoint of cost reduction in order to impel the purchasing public to greater usage of such devices.

SUMMARY OF THE INVENTION

Objects of the present invention, among others, are to provide an automatic ice cube maker which is constructed and arranged to not only reduce the manufacturing cost but to increase reliability in operation while reducing maintainance problems and the expenses attendant thereto. A further object is to achieve such salutary results without a reduction in the rate of production of the ice cubes and without any substantial increase in operating costs.

To this end the present invention may be summarized as comprising a tray driving assembly which includes, as its prime mover, a continuously operating permanent magnet synchronous motor. A plastic tray in which the cubes are frozen is connected periodically in driving relation to the motor as a consequence of which it is rotated to an inverted position and then twisted along its longitudinal axis to dislodge the cubes from the tray. The tray then continues to turn until it again attains an upright position and is prepared to receive another quantity of water.

The operation during which the tray is inverted and the cubes dislodged may be defined as the harvest cycle, and in accordance with the principles of this invention the time period between the harvest cycles may be selectively controlled. In addition, ice level sensing means are provided to discontinue operation of the ice maker upon the formation and collection of a predetermined quantity of cubes.

The invention features many improvements in the art of automatic ice cube makers the results of which enhance the prospects for much greater public acceptance and usage of such devices.

These and other features, advantgaes and objects of the present invention will be readily apparent from the following description of certain preferred embodiments thereof, taken in conjunction with the accompanying drawings, although variations and modifications may be effected without departing from the spirit and scope of the novel concepts of the disclosure.

BRIEF DESCRIPTION OF THE DRAWING

FIG. 1 is top plan view of an automatic ice cube maker constructed in accordance with the principles of the present invention;

FIG. 2 is a front elevational view of the automatic ice cube maker shown in FIG. 1 with an ice collection basket disposed immediately below the ice cube tray;

FIG. 3 is an enlarged elevational end view of the ice maker as it appears looking from left to right in FIG. 2.

FIG. 4 is an enlarged sectional view of an end portion of the ice cube tray taken substantially along lines IV—IV of FIG. 3;

FIG. 5 is an end view of operating mechanism of the ice maker substantially as it appears in looking along lines V—V of FIG. 1;

FIG. 6 is a sectional view taken along lines VI—VI of FIG. 5;

FIG. 7 is a sectional view taken along lines VII—VII of FIG. 5;

FIG. 8 is a sectional view taken substantially along lines VIII—VIII of FIG. 5;

FIG. 9 is a sectional view taken substantially along lines IX—IX of FIG. 5;

FIG. 10 is similar to FIG. 5 but certain parts have been omitted in order to illustrate more clearly the location and operation of other parts;

FIGS. 11 and 12 are plan views of certain cooperating members disclosed in FIG. 10;

FIG. 13 is similar to FIG. 10 with certain parts and portions of other parts removed in order to disclose the relative disposition of certain other parts;

FIG. 16 is an enlarged fragmentary cross-sectional view taken substantially along lines XVI—XVI of FIG. 14;

FIG. 17 is an elevational view which discloses certain members of the ice cube tray driving and timing gear trains including a tray driving gear and a final timing gear;

FIG. 18 is an elevational view of the tray driving gear shown in FIG. 17 in an inverted position to show the back side thereof;

FIG. 19 is an elevational view of the final timing gear shown in FIG. 17 in an inverted position to show the side thereof which faces the tray driving gear.

DESCRIPTION OF THE PREFERRED EMBODIMENTS

Figure 15:
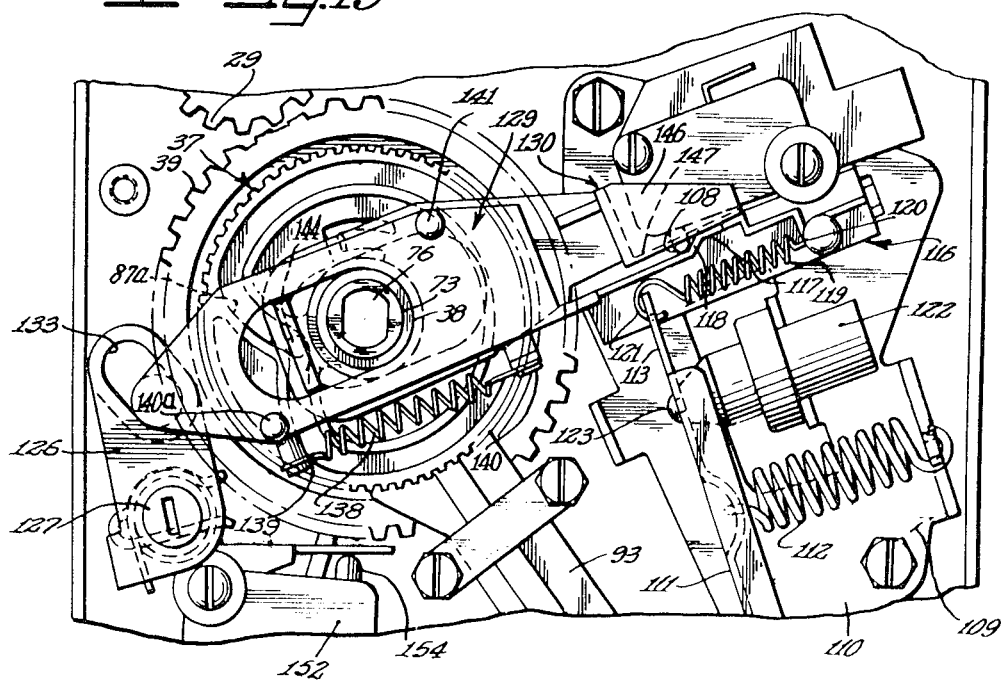
FIG. 15 is similar to FIG. 14 but illustrates the relative disposition of parts during operation of the ice level sensing mechanism when a high ice level condition has been detected.

Referring to the drawings and more particularly to FIGS. 1–3, an automatic ice cube maker constructed in accordance with the principles of the present invention is indicated generally at reference numeral 10 and comprises a plastic ice cube tray 11 in which are formed a plurality of individual ice cube molds or cavities 12. The cavities 12 are separated by wall members 13 in which are formed shallow interconnecting passageways 14 for enabling the water supplied thereto to seek a common level.

The tray 11 is disposed on one side of an operating mechanism housing 15 above which is mounted a water trough 16 which receives water from a valve situated remotely for filling the ice cube cavities 12. The valve preferably operates on a time basis as contrasted with a slug type water valve as will be understood by those skilled in the art.

The ice cube assembly 10 is adapted to be housed, for example, in the freezer section of a household refrigerator or the like. Disposed directly therebelow is an ice cube collection basket 17 which receives the frozen cubes ejected or discharged from the tray 11. A sensing wire which comprises a portion of an ice level sensing mechanism is indicated at reference numeral 18 and periodically sweeps across the upper portion of the collection basket 17 from a raised position indicated by the solid lines of reference numeral 18 to a lowered position indicated by the dash lines at 18′. In operation of the ice maker 10, an excessive collection of cubes in the basket 17 will tend to impede the movement of the wire 18 from the raised position thereof, the effect of which is to terminate operation of the ice maker 10 until a sufficient quantity of cubes have been removed from the basket 17.

As shown in FIG. 3 a lug 19 projects slightly outwardly from a back wall 20 of the housing 15. In order to manually terminate operation of the ice maker 10 a portion 21 of the wire 18, which portion resides in a vertical plane, may be lifted slightly outwardly away from the back wall 20 and raised over the lug 19 to the position of the wire indicated at reference numeral 22. The lug 19 then serves as a stop to arrest movement of the sensing wire 18 to the lower position thereof and as a consequence automatically terminates operation of the ice cube maker assembly 10.

The various parts of the ice maker operating mechanism will be described in relation to the function which they perform during operation of the ice cube maker. The entire operating mechanism is indicated generally in FIG. 5 at reference numeral 23.

Referring to FIGS. 5–9, the prime mover of the operating mechanism 23 comprises a continuously operating permanent magnetic synchronous electric motor indicated generally at reference numeral 24. The motor 24 serves to operate the various components of the ice maker 10 through successive ice making operations each of which includes a water fill cycle, a freeze cycle and a harvest cycle. In doing so, the motor 24 performs the function of periodically turning and twisting the tray 11 to eject the frozen cubes therefrom and is drivingly connected to the tray through a gear train assembly which includes a pinion gear 26 secured to the output shaft of the motor 24 and a gear 27 which is journalled for rotation on the back wall 20 of the housing 15. The pinion gear 26 and the gear 27 are in constant intermeshing relation with one another.

The gear 27 comprises one part of a gear assembly 28 (FIG. 7) on which is formed integrally therewith in addition to gear 27 another gear 29 and a third gear 30. Thus, gears 27, 29 and 30 are interconnected for joint rotation and move simultaneously with the motor pinion gear 26.

The gear 30 is interconnected with a transmission assembly indicated generally at reference numeral 31 which includes a gear 32 formed on a rotatable shaft 33. Gear 30 drives gear 32 through the transmission 31 and gear 32 in turn is in constant intermeshing relation with a gear 34 interconnected for joint rotation with a gear 36 through a rotatable shaft 37a. Gear 36, in turn, is in constant intermeshing engagement with another gear 37 (FIG. 6), which gear 37 may be defined as the "final timing gear."

Gear 37 is journalled for relative rotation therewith on a shaft 38 which extends axially from and is formed integrally with a gear 39, which gear 39 may be defined as the "tray driving gear."

The tray driving gear 39 is periodically driven by gear 29 (FIG. 7). As shown in FIG. 10, gear 39 is formed with a blank portion 40, which blank portion when disposed adjacent gear 29 permits the tray driving gear 39 to remain stationary while the gear 29 continues to rotate. It is only when the tray driving gear 39 is rotated slightly by the final timing gear 37 to move the blank portion 40 thereof away from the position thereof shown in FIG. 10 that the gear 29 meshingly and co-rotatably engages the tray driving gear 39.

By virtue of the transmission assembly 31 (FIG. 7) the speed of the gear 32, the final timing gear 37 and the other gears therebetween can be varied even though the motor 24 operates at a constant speed. To this end the transmission assembly 31 comprises a shaft 41 which is housed within a bore 42 formed in the gear assembly 28 and which is biased (downwardly as viewed in FIG. 7) by the action of a spring 44a also housed within the bore 42. Formed on the outer periphery of the shaft 41 are a pair of splined portions 43 and 44 which are disposed in axially spaced relation to one another and which are formed integrally with the shaft 41.

In addition, the shaft 33 on which gear 32 is formed is is journalled for rotation within a bore 46 formed in a stationary wall member 47 and a spring 48 which also resides within the bore 46 biases the shaft 33 axially (downwardly as viewed in FIG. 7). A splined portion is also formed on the shaft 33 as indicated at reference numeral 49.

Referring again to shaft 41, another gear 50 is mounted thereon for relative rotation therewith and comprises a central aperture 51 which is also splined to receive the splined portion 43 of the shaft 41. Another gear 52 is also journalled on shaft 41 for relative rotation therewith and comprises a central aperture 53 which is splined so that it may also meshingly engage the splined portion 43 of the shaft 41.

Gears 50 and 52 are arranged for independent rotation with respect to one another and are in constant intermeshing relation with gear portions 54 and 56 both of which are formed integrally for joint rotation on a gear member 57. The gear member 57, in turn, is centrally apertured as at 58 to receive the splined portion 49 of the shaft 33 in intermeshing relation.

Referring to FIGS. 5 and 7 a cam member 59 is mounted for relative rotation on a stationary shaft 60 and comprises an arm 61 which may be manually manipulated or rotated slightly in a clockwise or counterclockwise direction as viewed in FIG. 5. The cam 59 further comprises a pair of cams 62 and 63 which engage the lower ends of shafts 33 and 41 as these shafts are viewed in FIG. 7.

When the arm 61 is rotated or pivoted slightly in one direction of rotation, the shafts 33 and 41 are biased downwardly as viewed in FIG. 7. In this downward disposition of shafts 33 and 41 the driving arrangements through the transmission assembly 31 is as follows: The shaft 41 is rotated by gear 27 through splined portion 44 and rotates gear 52 through splined portion 43. The gear 52 in turn rotates the gear member 57 which is drivingly connected to the shaft 33 and thus the gear 32 by virtue of the splined portion 49 of the shaft 33. Thus, gear 32 is driven at one given speed.

When the lever 61 is pivoted about 90° in an opposite direction of rotation the cam surface 62 and 63 move shafts 33 and 41 upwardly as viewed in FIG. 7 so that the splined portion 49 of shaft 33 engages a splined aperture 64 of another gear 66. It will be apparent that the splined portion 49 of the shaft 33 is no longer in driving relation with gear member 57 and that the splined portion 43 of shaft 41 is no longer in driving relation with gear member 52. The driving arrangement through the assembly 31, therefore, in the raised positions of the shafts 33 and 41 as viewed in FIG. 7, is from the gear 27 and thus gear 30 through gear 66 and thence to shaft 33 via the splined portion 49 thereof.

A third gear ratio for the transmission 31 can be achieved by positioning the cam 59 in such a way that only the shaft 41 is depressed, allowing the shaft 33 to remain in the position shown in FIG. 7. In this arrangement, the drive from the motor would extend from the gear 27 to the shaft 41 and from the spline portion 43 through the gear 50 to the gear 56a. Since the gear 56a would be coupled as shown in FIG. 7 to the shaft 33, the drive would then be transmitted to the pinion 32.

As a result of the difference in the driving arrangement of the transmission assembly 31 in the raised and lowered positions and combination thereof (as viewed in FIG. 7) of shafts 41 and 33 the gear 32 on shaft 33 may rotate at three different speeds even though the prime mover or synchronous motor 24 runs at a constant speed.

Referring to FIG. 10, the disposition of the tray driving gear 39 with respect to the gear 29 during freeze cycles is as shown in FIG. 10 with the blank portion 40 in register with gear 29. After the final timing gear 37 which, as viewed in FIG. 9, is adjacent gear 39, rotates substantially through one complete revolution (the time duration for one complete revolution of gear 37 being in the order of about 120 minutes) the final timing gear 37 jogs or nudges the tray driving gear 39 slightly so that the gear 39 is brought into meshing engagement with the gear 29.

In performing this function the final timing gear 37 comprises, as shown in FIG. 19, a flexible arm 67 on the end of which is formed a shoulder or tang 68. A tray driving gear 39, as shown in FIG. 18 comprises a complementary flexible arm 69 on the end of which is formed a corresponding shoulder or tang 70. As the final timing gear 37 completes one revolution, the shoulder 68 thereof engages the shoulder 70 of the tray driving gear 39 to nudge gear 39 into driving relation with gear 29. When the gear 39 is driven by gear 29 it rotates at a much greater rate than does the final timing gear 37 and the opposite sides of the engaging shoulders 68 and 70 are contoured so that they abut but do not flex arms 67 and 69. Flexible arms 67 and 69 are deflected to permit shoulder 70 to ride over the shoulder 68 as the tray driving gear 39 rotates through one complete revolution when gear 39 is manually caused to be engaged with driver gear 29 by means other than that caused by nudging engagement of shoulders 68 and 70.

In operation, therefore, the electric motor 24 runs constantly and in doing so slowly rotates the final timing gear 37 while the tray driving gear 39 is out of meshing engagement with the constantly rotating gear 29. As the final timing gear rotates slowly through one complete revolution, however, it finally nudges the tray driving gear 39 into meshing engagement with the gear 29, whereupon the tray driving gear 39 and the tray 11 are quickly rotated through one complete revolution.

An outboard end 71 (FIG. 3) of the tray 11 is connected fast to the outboard end of the shaft 73, the inboard end of which shaft 73 is journalled in a bearing member 74 and which comprises a driven end 76 which is flatted for joint rotation with the tray driving gear 39. An outer surface 77 (FIG. 9) of the bearing member 74 provides a journal for the inboard end 78 (FIG. 2) of the tray 11 and thus while the outboard end 71 is connected for joint rotation with shaft 73 the inboard end 78 is permitted to rotate relative to the shaft 73.

Consequently, the outboard and inboard ends 71 and 78 of the tray 11 may rotate or twist relative to one another but nevertheless are biased to a neutral position relative to one another by virtue of a centering spring 79 (FIG. 6) having a pair of radially outturned ends 80 and 81 (FIG. 9) which are positively rotated respectively with the tray driving gear 39 in opposite directions of rotation thereof and which receive therebetween an axial extension 82 (FIG. 9) of the bearing member 74. Consequently, the inboard end 78 of the tray 11 is constantly biased into a neutral or central position with respect to the outboard end 71 but may be twisted relative thereto.

In order to dislodge the frozen cubes from the tray 11 when the tray is inverted during a harvest cycle, a stop or abutment wall 83 (FIGS. 1 and 2) is adapted to momentarily move into the path of travel of the inboard end 78, thereby momentarily arresting that end of the tray while the outboard end 71 continues to rotate. After the tray has been twisted through a predetermined angle, the stop 83 moves out of the path of travel of the inboard end 78 and the spring 79 causes the inboard end 78 to be rotated once again into prompt alignment with the outboard end 71.

Referring to FIGS. 13 and 17 the stop 83 comprises a lug formed on the distal end of an elongated arm 84 which is arranged for linear slidability. A stud 86 is formed on the other end of the arm 84 and rides in a continuous cam groove 86a (FIG. 18) formed on one face 88 of the tray driving gear 39. As the tray driving gear 39 rotates, the stud 86 rides in a high portion 86b of the cam groove 86a throughout the greater angle of rotation thereby moving the stop or lug 83 out of the path of travel of the inboard end 78 of the tray 11. On the other hand, the stud 86 rides in a lower portion 86c of the cam groove 86a through a reduced angle of rotation and it is while the stud 86 resides in portion 90 that the lug or stop 83 is moved momentarily into abutting or arresting relation with the inboard end 78 of the tray 11.

In order to prevent inadvertent rotation of the tray 11, means are provided for preventing rotation of the tray driving gear 39 until it is nudged by the final timing gear 37 into intermeshing engagement with the continuously running gear 29. For this purpose and as indicated in FIG. 17 a tray release arm assembly 91 is mounted for linear sliding movement adjacent the final timing gear 37 and the tray driving gear 39. The assembly 91 comprises two relatively slidable members 92 and 93 which are biased together to the relative disposition thereof shown in FIG. 17 by means of a coil spring 94, one end of which is connected to a stud 96 formed on member 92 and the other end of which is connected to a stud 97 formed on member 93.

Formed at an inner end 98 of the member 93 is an abutment shoulder 99 which normally resides in the path of travel of a corresponding lug 100 formed on the tray driving gear 39. Another lug 101 is formed on the inner end of member 92 and the entire assembly 91 is biased radially inwardly by means of a spring 91a (FIG. 6) in the direction of the final timing gear 37 and the tray driving gear 39, the axes of which the two gears are coincident.

In the disposition of the assembly 91 as viewed in FIG. 17, the lug 101 is biased radially inwardly against an outer surface of a raised portion 102 of a cam 103 formed on the final timing gear 37. In this position the lug 99 of the member 93 is in abutment with the lug 100 of the tray driving gear 39, thus precluding rotation of the tray driving gear 39.

As the final timing gear continues to rotate through one complete revolution, a lower portion 104 of the cam 103 is brought into alignment with lug 101, thus enabling the entire assembly 91 to be biased radially inwardly, the consequence of which is to move the lug 99 out of the path of travel of the lug 100 enabling the tray driving gear 39 to rotate.

It will be appreciated that, with respect to the final timing gear 37, the lug 68 and the lower portion 104 of the cam 103 are arranged with respect to one another such that the tray driving gear 39 is only permitted to rotate as the lug 68 nudges the gear 39 into engagement with the constantly rotating gear 29. After the tray driving gear rotates about 90° (or ¼ revolution) a ramp 174a on tray driving gear 39, FIG. 13, urges the release assembly 91 radially outward to bring the lug 99 once again into abutment position for the lug 100, thus precluding rotation of the tray driving gear 39 beyond 360° (or one revolution) and until the final tuning gear 37 again turns one complete revolution. A ramp 106 formed on the cam 103 of the continuing rotating final timing gear 37 can also cause the release assembly 91 with the lug 101 to move radially outward; however, this will only occur in the event that the tray drive gear and final timing gear have been manually caused to be out of normal timing sequence. During normal timing sequence the ramp 174a on tray driving gear 39 precedes the ramp 106 on the final timing gear 39 and cam surface 174 on the tray drive 39 will hold the release assembly 91 in the outward position while the ramp 106 on the final timing gear 37 passes the lug 99 and the surface 102 of the cam 103 will retain the release assembly 91 in the outward position after the surface 174 on the tray drive gear 39 is terminated at a point just before completion of one revolution of the tray drive gear.

As noted, the electric motor 24 operates continuously during operation of the automatic ice cube maker 10. Conditions will occur from time to time, of course, which will render the deenergization of the motor 24 desirable. For example, during a high ice level condition in the basket 17 the motor 24 should be deenergized to terminate the ice making operation. Furthermore, in the event that the temperature in the freezer section in which the ice maker 10 is housed should rise above a predetermined level, the operation of the ice maker 10 should also be terminated.

As shown in FIG. 10, a motor control switch 107 is operatively electrically connected to the motor 24 and is of the normally closed type. The switch 107 comprises a spring biased button or lever 108 which when in an outer position thereof as shown in FIGS. 5 and 10, serves to energize the motor 24, but when depressed to an inner position thereof as shown in FIG. 13, serves to deenergize the motor 24.

Also disclosed in FIG. 10 is a high temperature cut-out mechanism indicated generally at reference numeral 109. The mechanism 109 may be more particularly characterized as comprising a stationary mounting plate 110 on which is pivotally mounted an arm 111 which is biased in a clockwise direction by means of a relatively heavy coil spring 112. A flange 113 which is formed at the distal end of the arm 111 is adapted to abut a complemental flange 114 formed on a motor control switch actuating arm 116. The actuating arm 116 is mounted on the plate 110 for slidable reciprocal movement along its longitudinal axis and comprises a cam surface 117 disposed in proximate spaced relation to the switch lever 108 and an inclined ramp 118 leading thereto.

A coil spring 119, one end 120 of which is connected to the switch actuating arm 116 and an opposite end 121 of which is connected to the arm 111, serves to constantly bias the actuator arm 116 to the position thereof shown in FIG. 5. In this position the cam surface 117 is out of abutting engagement with the switch lever 108 as a consequence of which the motor 24 is energized.

The high temperature cut-out mechanism 109 also includes, however, a thermal element 122 fixedly mounted on the bracket 110 and having a movable piston 123 which is adapted to abut the arm 111. When the temperature in the freezer compartment is below a predetermined level, the piston 123 is in the retracted position thereof as shown in FIG. 10, but when the temperature exceeds a predetermined level, the piston 123 is moved outwardly to pivot the arm 111 in a counterclockwise direction to the position thereof as shown in FIG. 13. This movement of arm 111 and the bias of spring 119 cause the switch actuator arm 116 to move to the position thereof shown in FIG. 13, thereby causing the switch lever 108 to be engaged and depressed by the cam surface 117 to deenergize the motor 24.

When the temperature in the freezer compartment again falls below a predetermined level, the piston 123 of the thermal power element 122 will again retract and the spring 112 will again bias the arm 111 in a clockwise direction to cause the switch actuator arm 116 to again move to the position thereof shown in FIG. 10 thereby releasing the switch button 108 and causing the motor 24 to again become energized.

The inner end of the ice level sensing wire 18 turns inwardly through the back wall 20 of the housing 15 and is journalled for pivotal movement in a complemental bore formed in wall 20. As shown in FIG. 15 a bracket 126 is connected for joint pivotal movement with an inturned end 127 of the sensing wire 18. The pivotal bracket 126 comprises another component of the ice level sensing mechanism, which mechanism is indicated generally in FIG. 10 at reference numeral 128 and which further comprises a pair of relatively slidable members 129 and 130. FIGS. 11 and 12 illustrate members 129 and 130, not in an assembled condition, but with member 129 moved from withunder member 130 and inverted in order to disclose the underside thereof.

Figure 14:
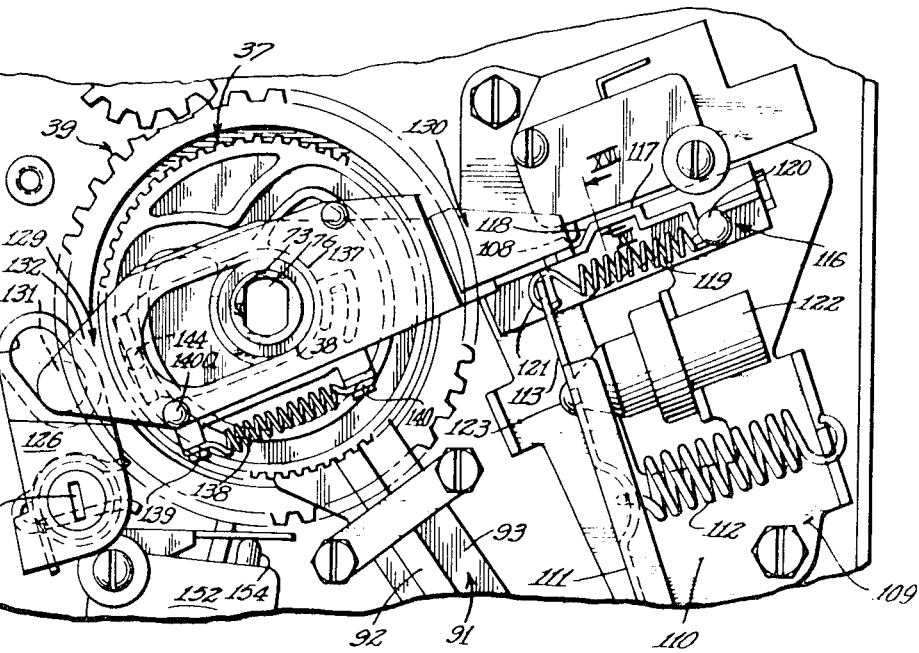
FIG. 14 is similar to FIG. 10 but discloses certain portions of the ice level sensing mechanism in the position assumed thereby before operation thereof.

FIG. 14 discloses the relative disposition of the various parts of the ice level sensing mechanism 128 in the position thereof when the wire 18 is in a raised position and before it has commenced its sweep over the top of the ice collecting basket 17. As shown, a stub shaft 131 projects from one end 132 of the member 129 and is received in a slot 133 formed in the pivotal bracket 126. Both members 129 and 130 are centrally slotted as at 134 and 136 respectively, which slots receive the shaft portion 38 of the tray driving gear 39 and a collar 137 extending from the final timing gear 37. In addition, the members 129 and 130 are biased together to the position thereof shown in FIG. 14 by means of a spring 138, one end 139 of which is connected to member 129 and another end 140 of which is connected to the member 130.

As shown in FIGS. 5, 14 and 15 a pair of studs 140a and 141 project from the sliding member 129 and are received respectively in elongated slots 142 and 143 formed in a stationary plate 145 mounted on the housing 15. It will be appreciated that the guidance afforded by the slots 142 and 143 will enable the member 129 to move only translatorily and will not permit the same to rotate.

As illustrated in FIG. 12, another stud 144 is formed on the companion sliding member 130. The stud 144 serves as a cam follower and rides in a cam groove 87 formed in the final timing gear 37 and thus moves reciprocably from one limiting end position to another as the final timing gear 37 rotates through one complete revolution.

The member 130 and the stud 144 formed thereon are arranged with respect to the cam groove 87 formed in the final timing gear 37 such that during the freeze cycle the members 129 and 130 are arranged in the position thereof shown in FIG. 14. However, as the stud 144 begins to move into a lower portion 87a (FIG. 17) of the cam groove 87 the slidable members 129 and 130 are moved to the position thereof shown in FIG. 10, the effect of which is to rotate the sensing wire shaft 127 in a clockwise position as viewed in FIG. 10, thus effecting a sweeping action of the wire 18 across the ice collection basket 17.

The slidable member 130 also comprises a bracket 146 which, as shown in FIG. 16, includes a wall member 147 which is disposed in proximity to the button 108 of the motor control switch 107. As the movable members 129 and 130 move from the position thereof shown in FIG. 14, which position is assumed thereby after the sensing wire 18 has moved to the sweeping or lowered position thereof shown in the dashed lines in FIG. 2, the wall 147 of the bracket 146, although it moves downwardly in front of the switch button 108, remains in spaced relation relative thereto and thus does not have the effect of deenergizing the motor 24.

On the other hand, when the slidable members 129 and 130 are caused to move by the rotation of the final timing gear 37, but the ice level sensing wire 18 is arrested against movement by virtue of a high ice level condition in the collection basket 17, the slidable member 130 will be urged downwardly while member 129 remains stationary.

This relative movement between slidable members 129 and 130 at a high ice level condition causes members 129 and 130 to move to the relative disposition thereof shown in FIG. 15, at which position the wall 147 of the bracket 146 is brought into abutting engagement with the motor switch button 108 to depress the button 108 and thus deenergize the motor 24. Neferring to FIGS. 11 and 12, the views therein illustrated of the slidable members 129 and 130 disclose a cam and cam follower which perform the function of moving the two members 129 and 130 to the relative position thereof shown in FIG. 15. For example, a cam groove 148 is moved on that surface 149 of the slidable member 129 which faces side 150 of the member 130 and receives a cam follower or lug 151 formed on the companion slidable member 130. As members 129 and 130 move conjointly at a low level ice condition, the member 130 moves only linearly but at a high ice level condition at which the member 129 remains stationary, the sliding movement of the member 130 relative thereto causes the cam follower 151 to shift on the cam groove 148 thus not only moving the sliding member 130 translatorily but also slightly pivoting the lower portion thereof including bracket 146 in the direction of the motor switch 107 to depress the switch button 108.

In view of the foregoing it will be appreciated that as the sensing wire 18 is moved back and forth across the collection basket 17, the bracket 146 moves back and forth between first and second positions, at neither of which does the bracket 146 serve to deenergize the motor 24. However, at a high ice level condition, the bracket 146 is moved to a third position, at which it does serve to depress the button 108 and deenergize the motor 24. Therefore, it is only at a high ice level condition that the bracket 146 moves from an operating position, at which the motor 24 remains energized, to an inoperative position, at which it depresses the button 108 to deenergize the motor 24.

The time phase water valve which regulates the flow of water into the tray 11 during the water fill cycle (which is at the end of the harvest cycle) is controlled by a normally open electric switch 152 (FIG. 10) which is pivotally mounted on a shaft 153 secured to the back wall 20 (FIG. 3) of the housing 15. The switch 152 may be more particularly characterized as comprising a spring biased depressible switch button 154 and a pivotal switch actuator arm 156. As shown in FIG. 13, the arm 156 has formed at the distal end thereof a triangularly shaped protuberance 157 which is biased outwardly or in a counterclockwise direction as viewed in FIG. 13 by the spring biased lever 154.

A cooperating cam shoulder 158 (FIG. 18) is formed on a cylindrical collar 159a of the tray driving gear 39 for engaging the protuberance 157 as it is rotated therepast and for depressing the same against the button 154 and controlled at 152 to energize the water fill valve.

The cam shaft 158 comprises an inclined ramp 159 leading to an outer cam water surface 160 thereof. The switch 152 is movably adjustable with respect to the tray driving gear 39 so that the water fill valve may be energized as the protuberance 157 engages any portion of the ramp 159.

This adjustability is provided by a threaded screw 161 mounted on a side wall 162 (FIG. 13) of the housing 15 which engages a complementarily threaded rack 163 fixedly connected to the housing of the water fill switch 152. Thus, the angle of rotation of the tray driving gear 39 through which the water fill valve is open (which in turn determines the quantity of water supplied to the tray 11 during each water fill cycle) can be controlled merely by adjusting the screw 161, the result of which adjustability determines the point of engagement between the protuberance 157 and the ramp 159 at which the water fill actuator lever 154 is depressed to energize the water fill valve.

The relative disposition of the water fill switch 152 and the tray driving gear 39 is such that the water fill valve is energized to open after the tray 11 has been inverted and twisted to dislodge the ice cubes therefrom and once again rotated to an almost upright or water fill position.

As noted, the tray 11 is positively rotated only at its outboard end 71 (FIG. 3) through or by virtue of a driving connection between the shaft 73 and the outboard end of the tray. Since the driving force applied to the outboard end 71 must be sufficient to twist the tray sufficiently to dislodge the cubes, and since the tray 11 is formed of plastic material, the present invention includes means for providing a driving coupling between the shaft 73 and the tray 11 without creating undesirable stresses within the plastic which may cause cracking or other injury to the plastic material.

Accordingly, the outboard end 71 of the tray 11 comprises an elongated plastic embossment 164 which, as shown in FIGS. 3 and 4, extends symmetrically radially outwardly from an aperture 166 formed therein which receives the distal end 167 of the shaft 73. This outer end 167 of the shaft 73 is substantially rectangularly shaped and is also received in a complementarily shaped aperture 168 which is formed in a metal or other suitable material reinforcing plate 169 housed within and shaped complementarily to the plastic embossment 164.

As a consequence of the reinforcing plate 169, the torque required in turning and twisting the outboard end 71 of the tray 11 is widely distributed throughout the plastic embossment 164 and the connecting walls thereof which join with the end portions of the tray II. This wide stress distribution enables the plastic tray to withstand the high torque requirements without being susceptible to injurious cracking, breakage or the like.

In connection with the actuator arm 116 (FIG. 13) it is noted that one end 172 thereof is tapered to provide a lug 173 which serves as a cam follower member. A cooperating cam surface 174 is formed on the tray driving gear 39. A recess 176 is shaped complementarily to and is adapted to receive the lug 173 of the actuator arm 116. When the temperature within the freezer section is below the predetermined level and the actuator arm 116 is urged to the position thereof as shown in FIG. 10 by the spring 112, the lug 173 resides in spaced relation to the recess 176. On the other hand, when the temperature within the freezer section rises above the predetermined level and the actuator arm 116 is urged to the position thereof shown in FIG. 13 by the thermal element 122, the lug 173 resides within the recess 176.

However, after the harvest cycle begins and the tray driving gear 39 is rotated slightly from the position thereof shown in FIG. 13, then the lug 173 is no longer in register with the recess 176 and instead is adjacent the cam surface 174. Consequently, if the temperature in the freezer section rises above the predetermined level after the tray driving gear 39 has rotated only slightly at the commencement of a harvest cycle, the actuator arm 116 is prevented from moving to the position thereof shown in FIG. 13 to depress the switch actuator button 108 and deenergize the motor 24 by virtue of the fact that the lug 173 abuts the cam surface 174.

Thus, once the harvest cycle commences and the tray 11 begins to rotate the high temperature cut out assembly 109 is ineffective to stop the operation of the ice maker 10 by deenergizing the motor 24 until the tray driving gear 39 and the tray 11 have turned through one complete revolution and the tray 11 again assumes an upright position. At this point in time the lug 173 again registers with the recess 176, enabling the actuator arm 116 to move to the position thereof shown in FIG. 13 to depress the switch button 108 and to deenergize the motor 24.

The outer end 170 (FIG. 1) of the operating mechanism housing 15 may be suitably enclosed by means of a cover plate or the like as indicated at reference numeral 171 in FIG. 5. As noted, the entire ice maker assembly 10 is preferably housed within the freezer compartment or section of a refrigerator and by virtue of its construction and arrangement is capable of a long, useful operating life with minimum operating and maintenance requirements.

Although minor modifications might be suggested by those versed in the art, it should be understood that I wish to embody within the scope of the patent warranted hereon all such modifications as reasonably come within the scope of my contribution to the art.

I claim as my invention:

1. In an automatic ice maker having a drive motor and a timing gear to control the rotation of an ice tray, a speed shifter comprising:
   a first shaft and means for coupling the motor drive thereto,
   a second shaft and means for coupling the timing gear thereto,
   a number of gears slidably positioned on at least one of said shafts and means causing one of said number to be corotative with said one shaft, gear means on the other of said shafts, and
   means for selectably meshing said gear means with said one of said number of gears on the other shaft, whereby a selectable speed ratio may be achieved between the motor drive input and the timing gear output.

2. A speed shifter in accordance with claim 1 wherein said means for selectably meshing said gear means with one of said number of gears comprises a splined segment on said one shaft, means biasing said one shaft outwardly of said number of gears, and cam means for selectably depressing said one shaft against said biasing force to engage said splined segment with a selectable one of said number of gears.

3. A speed shifter in accordance with claim 2 wherein said other shaft has a similar splined segment and is biased outwardly of its associated gear means and wherein cam means are provided to depress said other shaft for selectably engaging a gear of said gear means to vary the ratio of said speed shifter.

4. A speed shifter in accordance with claim 3 wherein cam means are provided to selectably depress one of said shafts or both of said shafts whereby a small axial movement of either one of said shafts is required to produce the desired number of available gear ratios.

5. In an automatic ice making device having a drive motor and a timing gear to control the rotation of an ice tray, a speed shifter comprising:

a pair of shafts, each carrying a number of freely rotatable gears thereon,
one of said shafts having an input coupling to said drive motor and the other of said shafts having an output coupling to said timing gear,
both of said shafts having a splined surface portion for engaging one of said freely rotatable gears, and
means for moving said shafts axially thereof with respect to said freely rotatable gears and for causing a selected one of said gears on one of said shafts to mesh with a selected one of said gears on the other shaft whereby a selected gear ratio between the drive motor input and the speed shifter output may be realized.

6. A speed shifter in accordance with claim 5 wherein three gears are associated with each shaft and wherein said shafts each have a free end for being depressed by a cam, the spline surface of each shaft normally engaging the associated gear which is axially closest to the free end thereof and wherein movement of the shafts inwardly toward the associated gears causes the respective splined surfaces to engage other ones of said associated gears to vary the gear ratio between the shafts.

7. A speed shifter in accordance with claim 6 wherein the shaft which is coupled to the drive motor has first and second freely rotatable gears disposed thereon and a third gear which is fixedly secured to the shaft and wherein the other shaft has three gears freely rotatable thereon with the two gears closest to the free end of the shaft being fixedly secured to each other.

8. In an automatic ice making device having a drive motor and a timing gear to control the rotation of an ice tray, a speed shifter comprising:
   a pair of shafts disposed in side-by-side relation,
   each carrying a number of freely rotatable gears thereon.
   one of said shafts having an input coupling to said drive motor and the other of said shafts having an output coupling to said timing gear,
   each of said shafts having a splined segment and each shaft being biased in the same axial direction with respect to a fixed reference,
   said number of freely rotatable gears being fixed axially with respect to said reference,
   each gear on each shaft being meshed with an associated gear on the other shaft, and
   means for moving said shafts against the biasing force applied thereto to move said splined segments into meshed relation with selected ones of said number of gears whereby a selectable gear ratio can be achieved between the motor drive and the timing gear.

9. A speed shifter in accordance with claim 8 wherein cam means are associated with each of said shafts for selectably depressing the same to move said splined segment into engagement with one of said freely rotatable gears.

10. A speed shifter in accordance with claim 9 wherein said cam means has a selectable cam surface for depressing one of said shafts independently and for depressing both of said shafts jointly and for allowing both of said shafts to remain in a non-depressed state.

References Cited

UNITED STATES PATENTS 3,449,920  6/1969  Van Steenburgh _____ 62—136
3,362,181  1/1968  Linstromberg _____ 62—135

MEYER PERLIN, Primary Examiner

R. C. CAPOSSELA, Assistant Examiner

U.S. Cl. X.R.

62—344, 353